United States Patent
Richards (10) Patent No.: US 9,857,144 B2
(45) Date of Patent: Jan. 2, 2018

(54) ELECTRONIC ADAPTIVE RETICLE SYSTEMS AND METHODS

(71) Applicant: FLIR Systems, Inc., Wilsonville, OR (US)

(72) Inventor: Austin A. Richards, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 70 days.

(21) Appl. No.: 14/954,884

(22) Filed: Nov. 30, 2015

(65) Prior Publication Data

US 2016/0169625 A1    Jun. 16, 2016

Related U.S. Application Data

(60) Provisional application No. 62/090,320, filed on Dec. 10, 2014.

(51) Int. Cl.
| | |
|---|---|
| G06F 19/00 | (2011.01) |
| F41G 3/16 | (2006.01) |
| H04N 5/232 | (2006.01) |
| H04N 5/272 | (2006.01) |
| F41G 1/38 | (2006.01) |
| F41G 11/00 | (2006.01) |
| F41G 3/06 | (2006.01) |
| F41G 3/08 | (2006.01) |
| H04N 5/33 | (2006.01) |

(52) U.S. Cl.
CPC .............. *F41G 3/165* (2013.01); *F41G 1/38* (2013.01); *F41G 3/06* (2013.01); *F41G 3/08* (2013.01); *F41G 11/003* (2013.01); *H04N 5/23293* (2013.01); *H04N 5/272* (2013.01); *H04N 5/332* (2013.01)

(58) Field of Classification Search
CPC ... F41G 3/165; F41G 1/38; F41G 3/06; F41G 3/08; F41G 11/003; H04N 5/23293; H04N 5/272
USPC .......................... 235/413, 404, 407, 414, 417
See application file for complete search history.

(56) References Cited

U.S. PATENT DOCUMENTS

2006/0005447 A1* 1/2006 Lenner ...................... F41G 3/06
                                                                     42/111

* cited by examiner

*Primary Examiner* — Karl D Frech
(74) *Attorney, Agent, or Firm* — Haynes and Boone, LLP (57) ABSTRACT

A system may be provided that includes a scope configured to mount to a firearm. The scope may include imaging components, processing components, and a display. The processing components may generate an adaptive electronic reticle for the scope. The adaptive electronic reticle may be displayed with the display and may have a shape, a color, a style, a position, and/or other features based on the firearm, an ammunition type, a target type, a target range, a wind speed, a color of an image of a target scene, and/or other target scene information. The reticle may be generated to be a reticle that maximizes the reticle contrast relative to the target scene, a textured reticle, a moving reticle, a Mil-Dot reticle, and/or a custom ballistic reticle. Laser rangefinder input may be used to automatically determine a reticle location based on ballistics data and the range to a target.

20 Claims, 9 Drawing Sheets

ELECTRONIC ADAPTIVE RETICLE SYSTEMS AND METHODS

CROSS-REFERENCE TO RELATED APPLICATIONS

This patent application claims the benefit of and priority to U.S. Provisional Patent Application No. 62/090,320 filed Dec. 10, 2014 and entitled "ELECTRONIC ADAPTIVE RETICLE" which is hereby incorporated by reference in its entirety.

TECHNICAL FIELD

One or more embodiments of the invention relate generally to firearms and, more particularly, to a sighting system for firearms having an electronic adaptive reticle.

BACKGROUND

Scopes are commonly used on high powered rifles for shooting targets at long distances. Such scopes provide magnification that allows a shooter to more easily see the target and more easily aim the rifle. Thus, the use of scopes can enhance the accuracy of the rifle.

A scope commonly includes a reticle aligned with the barrel of the rifle that indicates to a user looking through the scope where the rifle is pointed. The reticle is typically a mechanical structure in the line of sight of the scope such as a crosshairs on a transparent glass or plastic member of the scope. In some systems, an electronic reticle is provided that mimics the mechanical reticle. However, with both conventional mechanical and electronic reticles, the reticle is often difficult to see due to the content of the scene being viewed with the scope. This can cause difficulty aiming of the firearm which can be inconvenient or even dangerous, particularly in combat situations. It would therefore be desirable to be able to provide improved electronic reticles.

SUMMARY

Methods and systems are provided for one or more embodiments for adaptive electronic reticles for firearm scopes. An adaptive electronic reticle may be adaptive to the content of a scene being viewed through the scope. The adaptive electronic reticle may be generated and/or altered based on the scene content to provide enhanced viewability and function of the reticle for the user.

In one embodiment, the scope may be an imaging scope such as a thermal imaging scope. In a thermal imaging scope, thermal images of a scene may be captured and displayed to the user. An electronic adaptive reticle may be overlaid or otherwise combined with the thermal image. The electronic adaptive reticle may be adapted to the scene content by a user selection of an appropriate reticle and/or responsive to image data in the captured thermal images.

According to an embodiment, a system is provided that includes a scope configured to mount to a firearm, the scope including an imaging component configured to capture an image of a target scene; a processing component configured to generate an adaptive electronic reticle based on at least the image; and a display component configured to display the adaptive electronic reticle.

According to another embodiment, a method is provided that includes capturing an image of a target scene; generating an adaptive electronic reticle based on at least the image; and displaying the adaptive electronic reticle with a scope of a firearm.

The methods and systems disclosed herein better facilitate shooting at targets, such as in hunting or combat situations. More particularly, the methods and systems disclosed herein better facilitate the aiming of high power rifles at targets which are at great distances from the shooter. These methods and systems also better facilitate shooting in high winds, and under limited light conditions, such as at night.

The invention disclosed herein is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Methods and systems are provided for generating electronic adaptive reticles for a ballistic sight system. The ballistic sight system may be an imaging sight system such as a thermal imaging riflescope. The riflescope may capture thermal images of a target scene and generate an electronic reticle adapted to be readily visible in contrast with the scene.

The adaptive electronic reticle may be a dynamic reticle having a color, size, and/or shape that maximize its contrast with respect to the target scene. Captured thermal images and the reticle may be displayed to an operator of the rifle on a common display. In some embodiments, a reticle may be generated and displayed that extends through the target in both vertical and horizontal axes and maximizes contrast between the reticle and the target or scene behind the target. The reticle may be displayed in line with a direct view of the target scene through the scope or overlaid or otherwise combined with an image of the target scene.

The reticle may be selected by a user for a given scene, target type, ballistics condition, environmental condition, or other criteria or the reticle may be generated by the system in response scene information, a target type, a ballistics condition, an environmental condition or other information provided by the user or determined by the system based on captured images and/or data from other sensors such as a rangefinder or environmental sensor such as a wind speed sensor.

Figure 1:
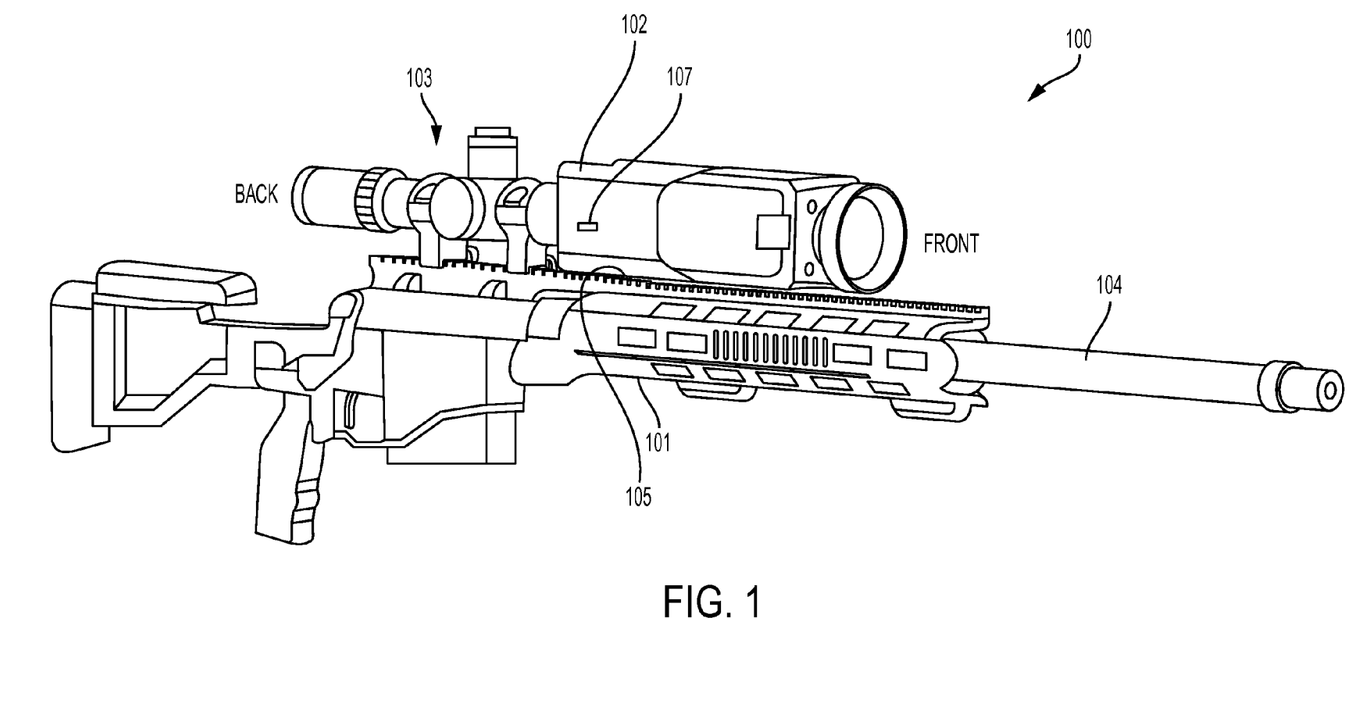
FIG. 1 shows a system having a scope mounted to a rifle, in accordance with an embodiment.

FIG. 1 shows a system 100 that includes a rifle 101, and a scope 102 in accordance with an embodiment of the invention. The rifle 101 can be a sniper rifle, such as a 50 caliber Barrett M82A1 or an M107 Long Range Sniper Rifle (LRSR), for example. Although the ballistic sight system is particularly well suited for use with high power, long range rifles, the ballistic sight system can be used with any rifle, handgun or other type of firearm provided in any caliber.

Figure 2:
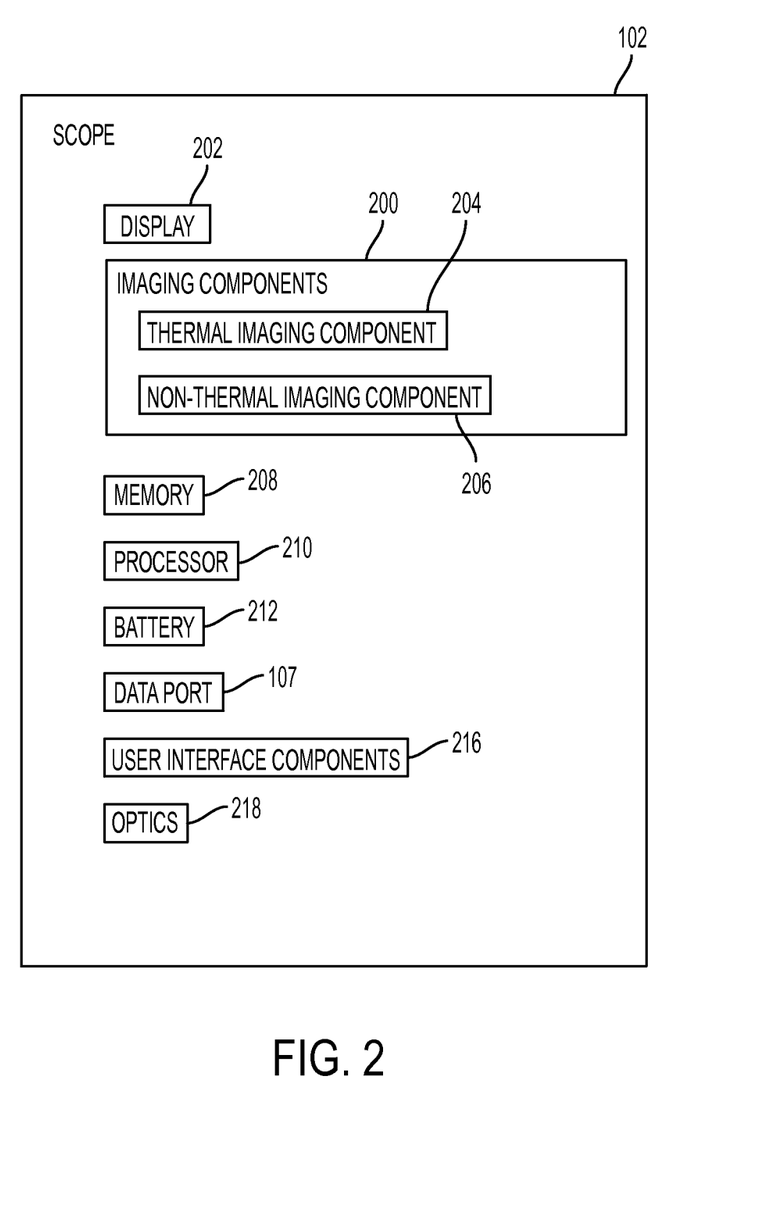
FIG. 2 shows a block diagram of an imaging rifle scope, in accordance with an embodiment of the invention.

The scope 102 can mount in parallel with the barrel 104 of the firearm 101. Thus, the scope 102 can view the target scene at which the rifle is aimed and can provide a direct view of the scene and/or an image of the scene along with an adaptive electronic reticle with a display component such as display 202 (FIG. 2). Display 202 may be disposed at a rear end of the scope 102 so that the display may be viewed by a user of the firearm when aiming the firearm at a target.

As shown in FIG. 1, optics 103 can be provided to facilitate viewing of the display of the scope 102. However, this is merely illustrative. In various embodiments, the user may directly view the display of the scope.

Scope 102 may be a thermal imaging riflescope having a thermal imaging camera. However, this is merely illustrative. In various embodiments, scope 102 may be a direct view scope and/or may include a visible light camera, an ultraviolet camera, an infrared camera (such as a thermal infrared camera, a non-thermal infrared camera, a near infrared camera, a far infrared camera, a short wavelength infrared camera, a medium wavelength infrared camera, or a long wavelength infrared camera) or any other type of camera. The camera can be any type of camera that can provide an image of a target scene. Scope 102 may include processing circuitry and display circuitry for generating and displaying an adaptive electronic reticle in combination with any suitable camera image or direct view of a target scene. In embodiments in which the scope is a direct view scope, the reticle may be generated with a display component that is a transparent or semitransparent optical element through which the user views the scene directly (e.g., a semitransparent liquid crystal or light emitting diode element mounted in line with other optical elements (e.g., lenses) of the scope) or with a display component that projects the reticle onto another optical element (e.g., a lens or eyepiece) of the scope or directly into the eye of the user.

The scope 102 can be used with passive or active illumination by the scope. The camera can be used with natural illumination such as sunlight, starlight, or moonlight. The camera can be used with artificial illumination, such illumination provided by an infrared light source.

The scope 102 may include an input port 107 for receiving an external device such as universal serial bus (USB) device. For example, a USB device may be coupled with a data input port such as port 107 to provide ballistics information and/or other sensor information to scope 102 for generating ballistics tables and/or other ballistics information for generating a reticle. The scope 102 can attach to the rifle 101 via scope mounting structures 105 such as a Picatinny rail.

FIG. 2 is a block diagram showing components that may be included in scope 102 according to an embodiment. As shown in FIG. 2, scope 102 may include imaging components 200, a display 202, memory 208, a processing component such as processor 210, a power source such as a battery 212, data port 107, and user interface components 216.

Imaging components 200 may include a thermal imaging component 204 (e.g., a cryo-cooled indium antimonide (InSb) imager or a microbolometer array) and/or a non-thermal imaging component 206 (e.g., a charge coupled device (CCD) imager or a complementary metal oxide semiconductor (CMOS) imager).

Imaging components 200 can provide electronic image signals to processor 210. The processor 210 can be a general purpose processor, a dedicated processor, or any other type of processor. The processor 210 can control functions of the imaging components, such as focusing and/or zooming of the imaging components.

The processor 210 can provide an electronic output to the display 202. The display 202 can show images captured by the imaging components 200. Processor 210 may generate an adaptive electronic reticle and provide the generated reticle to display 202 for display in combination with one or more images from imaging components 200 and/or in line with a direct view of a target scene through scope 102

The display 202 can be an organic light emitting diode (OLED) display, a light emitting diode (LED) display, or a liquid crystal display (LCD) (as examples). The display 202 can be any other type of display. The display 202 can be a high resolution (OLED) display. For example, the display 202 can have a resolution of 600×1024, 480×800, 800×1280, 1746×1000, 1024×1024, 2048×2048, or more. The display 202 can have any desired resolution. Optics 218 can be provided to provide a direct view of a target scene through the scope 102 and/or to facilitate viewing of the display 202.

The processor 210 may be configured to generate an adaptive electronic reticle based on user input information, ballistics information and/or scene information in a captured image such as a thermal image. Processor 210 may receive external information such as ballistics information for a particular firearm and/or ammunition type via data port 107 and may store the received information using memory 208 (e.g., volatile or non-volatile memory).

User interface components 216 may include one or more buttons, switches, or other input and/or output components for receiving input from a user and/or providing output information to the user. User interface components and/or port 107 can be used to provide firearm information, ammunition information, target information, range information, bullet drop and/or windage information to the processor 210.

Processor 210 may generate the adaptive electronic reticle based on the provided information and/or based on scene content (e.g., in a capture image of the target scene).

FIGS. 3, 4, 5, 6, 7, 8, 9, 10A, and 10B show examples of adaptive electronic reticles that may be generated and provided to a user of system 100.

Figure 3:
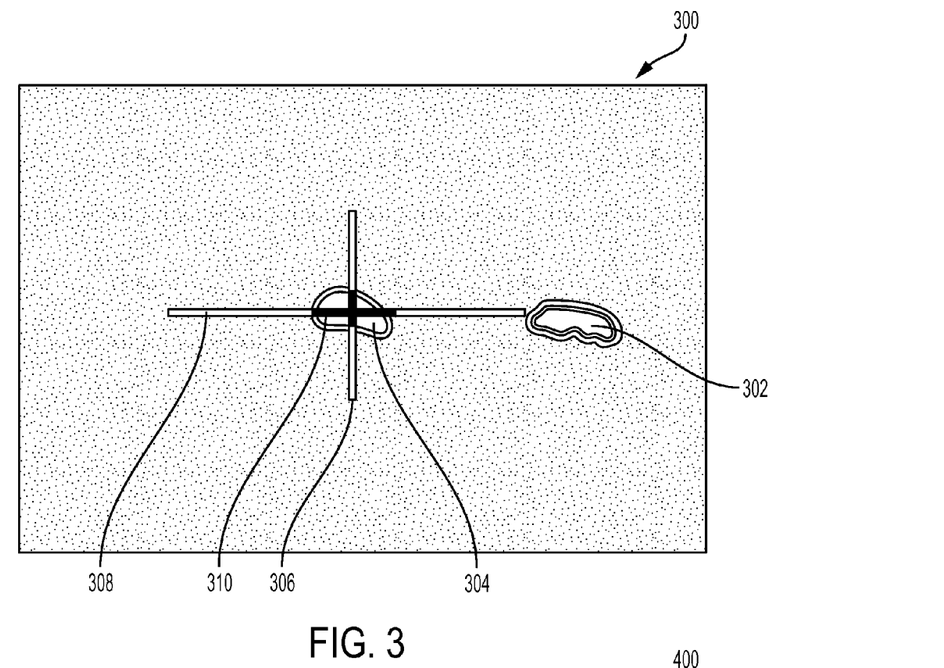
FIG. 3 shows an illustrative scope image with an example of an adaptive electronic reticle, in accordance with an embodiment.

In the example of FIG. 3, a target scene image 300 is shown that may be generated by scope 102. As shown, target scene image 300 may include one or more target objects such as targets 302 and 304 (e.g., animals in the example of FIG. 3) and an adaptive electronic reticle 306. For example, image 300 may be a thermal image of a target scene with target objects 302 and 304. In order to increase the visibility of reticle 306, particularly in the central crosshairs region when the crosshairs of the reticle are in line with a target such as target 304, the reticle may be generated having an inverted grey level value or color so that the reticle is the opposite tonality (or opposite color value on a color wheel) of the scene or target in image 300. The grey level or color central portion or any other portion of the reticle may be inverted with respect to other portions of the reticle or with respect to the image when image pixel values in line with that portion of the reticle are above or below a particular threshold.

In the embodiment shown in FIG. 3, reticle 306 includes crosshairs that extend through the target 304 in both vertical and horizontal axes and maximizes contrast between the reticle and the target by including an outer portion 308 having a first grey level and an inner portion 310 having a second (e.g., opposite) grey level. In this way, the central portion of the crosshairs of the reticle may be enhanced when the target is in the crosshairs.

In various embodiments, the reticle 306 can also include a plurality of tick marks or other features, such as bullet drop tick marks on the vertical member as discussed further hereinafter. Windage tick marks can similarly be provided on the horizontal member of the reticle 306.

Figure 4:
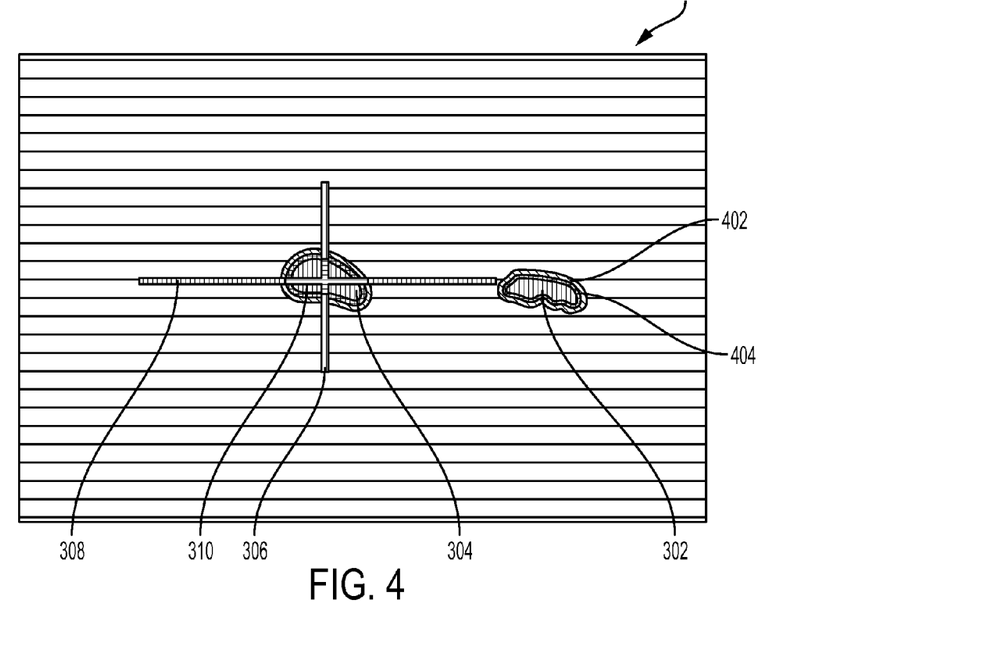
FIG. 4 shows an illustrative scope image with an example of an adaptive electronic reticle generated using a color look-up table, in accordance with an embodiment.

The example of FIG. 3 shows a greyscale image. However, this is merely illustrative. As shown in FIG. 4, a reticle 306 having a central portion 310 and an outer portion 308 may also be provided having opposite color values in a color image such as color image 400 in which various colors such as colors 402 and 404 are used to indicate different temperatures of objects in the image. Reticle 306 may be generated, at least in part, by detecting the thermal signature of a target such as target 304 and determining and/or controlling the color (or grey scale values) of the reticle based on the thermal properties or the target and the location of the target relative to the crosshairs.

A threshold for reticle pixel inversion may be provided such as a factory selectable threshold or a user adjustable threshold (e.g., in an advanced menu for the user). For a color look-up table (LUT) on the image, the reticle colors may invert color value.

Figure 5:
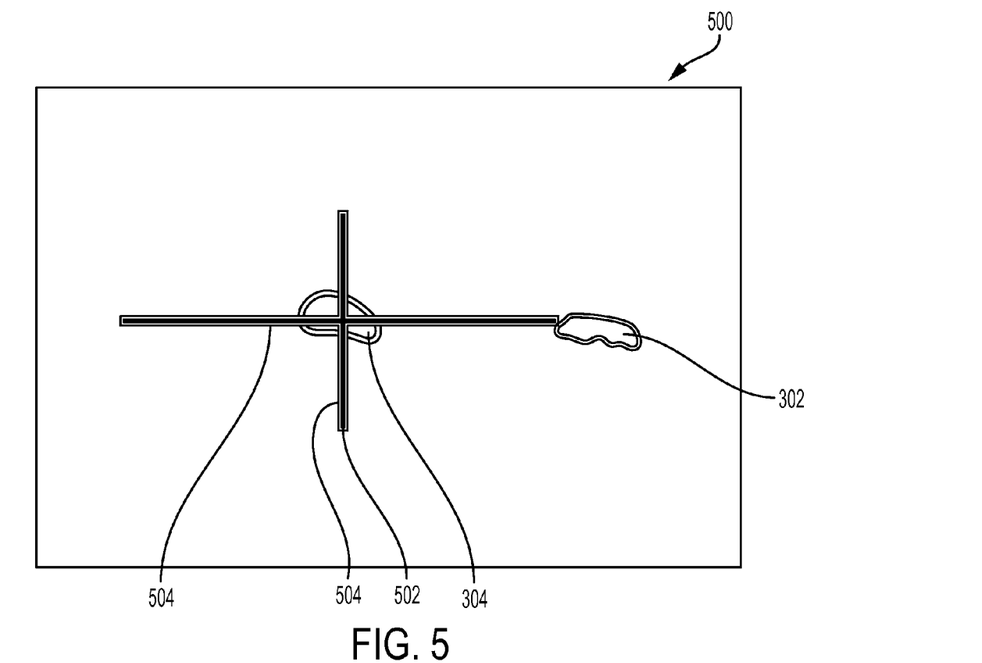
FIG. 5 shows an illustrative scope image with an example of an adaptive electronic reticle having a border enhancement feature, in accordance with an embodiment.

Other visual enhancements for an adaptive electronic reticle may also be provided. For example, as shown in FIG. 5, a reticle 502 may be provided with a border enhancement 504 that helps distinguish the reticle visually from the rest of a target image such as image 500 by providing a reticle that includes both light and dark pixels at all times.

The border enhancement 504 may have an opposite greyscale value or an opposite color to the remaining portion of reticle 502. Border enhancement 504 may be provided consistently as thermal images are captured and displayed and/or border enhancement 504 may be added and/or altered when a target such as target 504 is in the crosshairs to indicate to the user that the trigger should be pulled.

Figure 6:
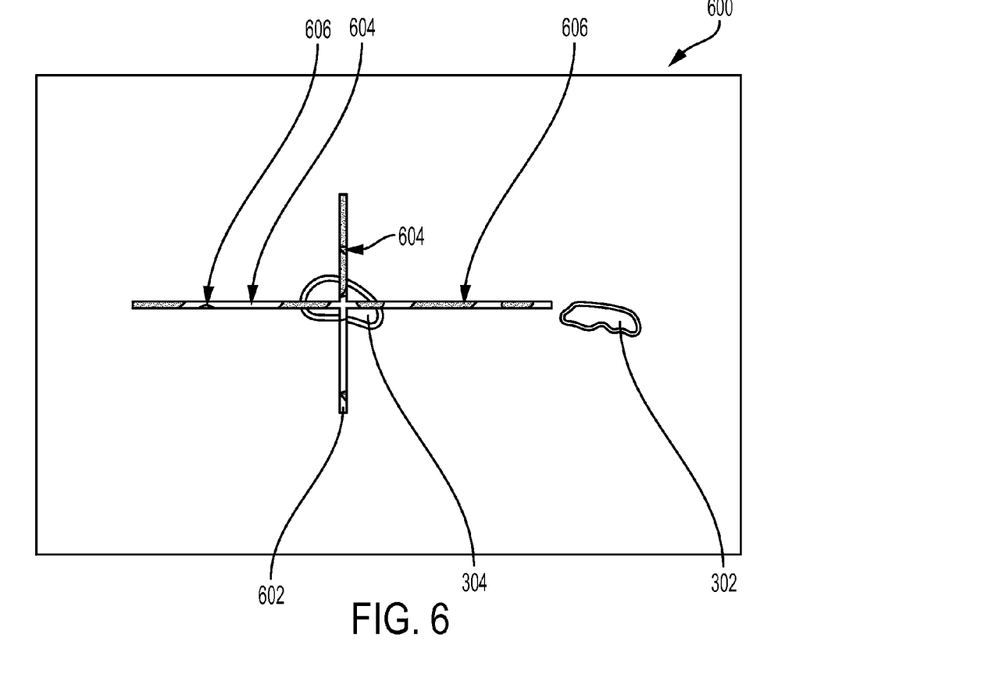
FIG. 6 shows an illustrative scope image with an example of an adaptive electronic reticle having a textured pattern, in accordance with an embodiment.

As shown in FIG. 6, a reticle such as reticle 602 that is generated and combined with an image such as a thermal image 600 may be provided with a texture having regularly or irregularly alternating light portions 604 and dark portions 606. For example, the texture may be a camouflage pattern as in FIG. 6 or a zebra pattern or other pattern. In some embodiments, the pattern may move or change over time in a manner that is not distracting to the viewer, but is noticeable to differentiate the reticle from the target. The moving or changing pattern may move or change over time continuously or may move or change in response to scene content and/or movement of the firearm. For example, the patterns 604 and 606 of light and dark could slowly "crawl" along from side to side so the shooter always is aware of the reticle and it does not visually disappear against the target or background.

Figure 7:
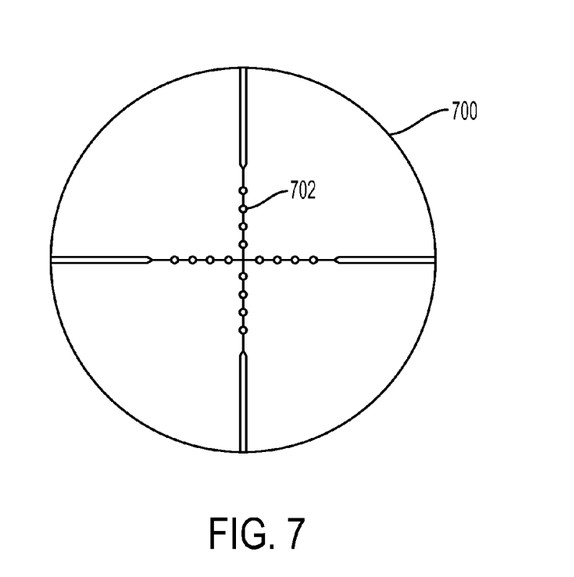
FIG. 7 shows an example of an adaptive electronic Mil-Dot reticle, in accordance with an embodiment.

Any of the above visual enhancements may be included or combined with ballistics features of the reticle. For example, as shown in FIG. 7, an adaptive electronic reticle may be an adaptive electronic Mil-Dot reticle 700 for rangefinding. Mil-Dot reticle 700 may include ballistics features such as beads 702 on the reticle that are, for example, spaced 1 milliradian (or Mil) apart. By looking at the number of milliradians that a target subtends, and knowing the actual height of the target, one can estimate the range to the target and compensate for bullet drop based on the estimated range. For example, a typical human male may be about 1.8 yards tall. If he subtends 5 milliradians as measured by the Mil-Dot reticle, then he may be approximately 360 yards away, and a shooter can hold over by the correct number of Mils to compensate for the bullet drop at 360 yards. Depending on the caliber and the length of the barrel, the holdover might be, for example, 2.5 milliradians. Mil-Dot reticle 700 may be provided with inverted colors and/or patterns as described herein.

Figure 8:
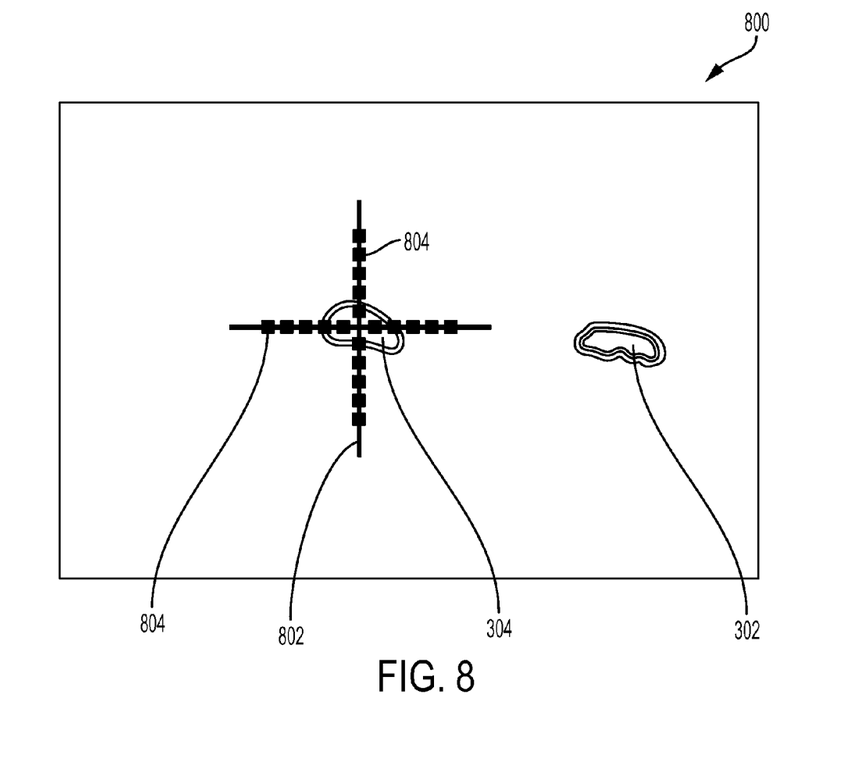
FIG. 8 shows an illustrative scope image with an example of an adaptive electronic Mil-Dot reticle with square dots, in accordance with an embodiment.

In another embodiment, beads 702 may be replaced with other patterns, colors, and/or shapes such as squares 804 in a modified Mil-Dot reticle 802 as shown in image 800 of FIG. 8. The pattern of dots 702 or 802 may be rescaled when an imaging component is zoomed in or out.

In some embodiments, a rangefinder such as a laser rangefinder may be included and/or attached to the scope so that data from the rangefinder is fed into the electronics of the scope to determine elevation changes for the reticle. For example, a reticle may be moved up or down in the scope view in response to the rangefinder range input. The reticle may be moved up or down based on ballistics information such as user-provided ballistic tables (e.g., tables loaded into the system through the USB interface) for their particular gun and ammunition so that the user can place the center of the crosshairs on the target rather than placing the target a hold location other than the center of the crosshairs.

The user may be provided with the ability to upload a range-selective reticle that is designed for their gun's ballistics. These reticles may also include other ballistics features such as windage markings for wind holds, also tailored to the gun and particular ammunition.

Figure 9:
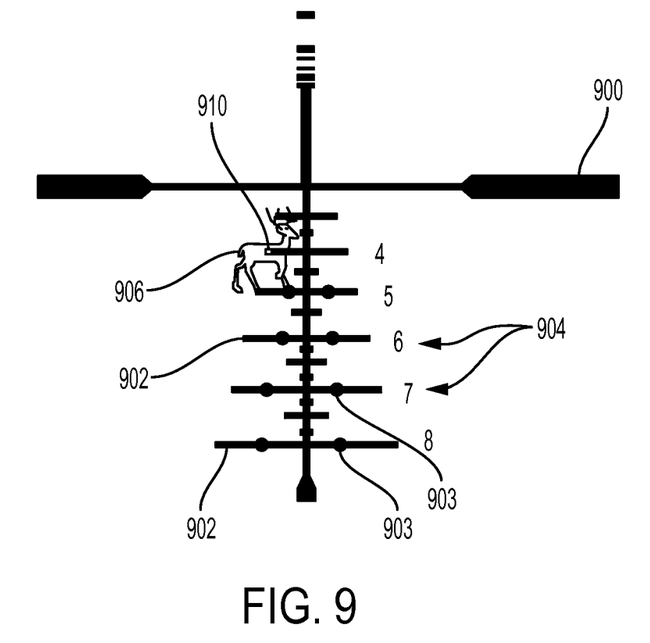
FIG. 9 shows an example of an adaptive electronic reticle suitable for bullet drop and windage adjustments, in accordance with an embodiment.

An example of such as reticle is shown in FIG. 9. As shown in FIG. 9, a reticle 900 may be generated and displayed with a direct view or an image of a target such as a deer 906. In the example of FIG. 9, the deer 906 is located at a range of 400 yards with, for example, a 4 mph wind hold.

As shown in FIG. 9, reticle 900 has ballistics features such as markings 902 along the vertical axis for 400, 500, 600, 700, and 800 yard holds. The shooter may elevate the rifle to line the target up with the reticle at the appropriate range, which, for example, can be determined with an included or separate laser rangefinder. The holds may be indicated by a numerical indicator 904 for each hold. Reticle 900 may also include additional ballistics features such as dots 903 to the left and right of the center vertical line on each marking 902 that indicate wind holds (e.g., wind holds in wind speed increments such as 10 mph increments of wind speed) at that range.

For example, using the USB interface 107 (see, FIGS. 1 and 2), a user may upload a custom reticle. The custom reticle may be a reticle obtained as a download from, for example, a manufacturer website. Downloadable reticles may be provided by the scope manufacturer for, for example, various standard hunting rifles and hunting loads.

As shown in FIG. 9, reticle 900 may be displayed along with a target indicator 910. Target indicator 910 may be displayed at the location of the target based on detection and tracking of the target in captured images such as thermal images. For example, a target may be detected in a thermal image based on a temperature above a particular temperature threshold and/or an intensity value above an intensity threshold. Once detected, the location of the target may be tracked using subsequently captured (e.g., continuously captured) thermal images.

A shooter may use the image of the target, the target indicator, and/or the reticle markings to achieve bullet drop and windage compensation when aiming at the target. For example, the shooter can use tick marks 902 below the crosshair to compensate for bullet drop when aiming at such a distant target and marks 903 on the reticle for windage adjustments.

However, in some situations it may be undesirable to use reticle markings other than the crosshair when shooting at long distances. Errors can be made in determining which of the tick marks to use then in using the correct tick marks when shooting. Further, an aim point may not actually be at a particular tick mark, but rather may be between tick marks or off to the side of the tick marks. Determining the correct tick mark and then using the tick mark correctly can therefore be difficult, especially in combat situations. In some embodiments, reticle 900 or other electronic adaptive reticles as described herein may be moved based on ballistics, range, and/or windage information so that, when the user moves the firearm to place the crosshair on the target, bullet drop and windage corrections have already been made. In these embodiments, the crosshair may, for example, be moved to a location other than the center of the scope.

In some embodiments, image processing may be performed to detect the presence of a potential target within a region of interest (ROI) in an image. The region of interest and the potential target may be indicated using the display with a target indicator. For example, a blob or blobs having a particular temperature or temperature range inside a region of interest may be detected and a target indicator may be drawn or otherwise presented at the locations of the centroids of non-connected blobs inside the ROI.

Figure 10A:
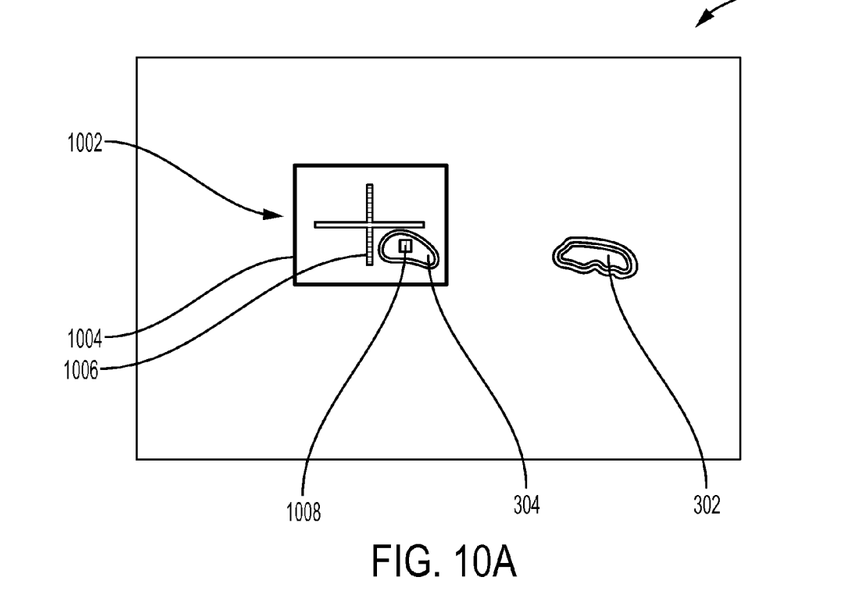
FIG. 10A shows an illustrative scope image with an example of an adaptive electronic reticle having a region of interest indicator, a target indicator, and a crosshairs, in accordance with an embodiment.

FIG. 10A shows an exemplary image 1000A having targets 302 and 304 with a target indicator 1008 displayed on the target 304 in a region of interest indicated by ROI indicator 1004. An adaptive electronic reticle 1002 may include ROI indicator 1004, target indicator 1008, and crosshairs 1006. Any or all of ROI indicator 1004, target indicator 1008, and crosshairs 1006 may be provided with any of the enhanced visibility adaptive features described herein.

Figure 10B:
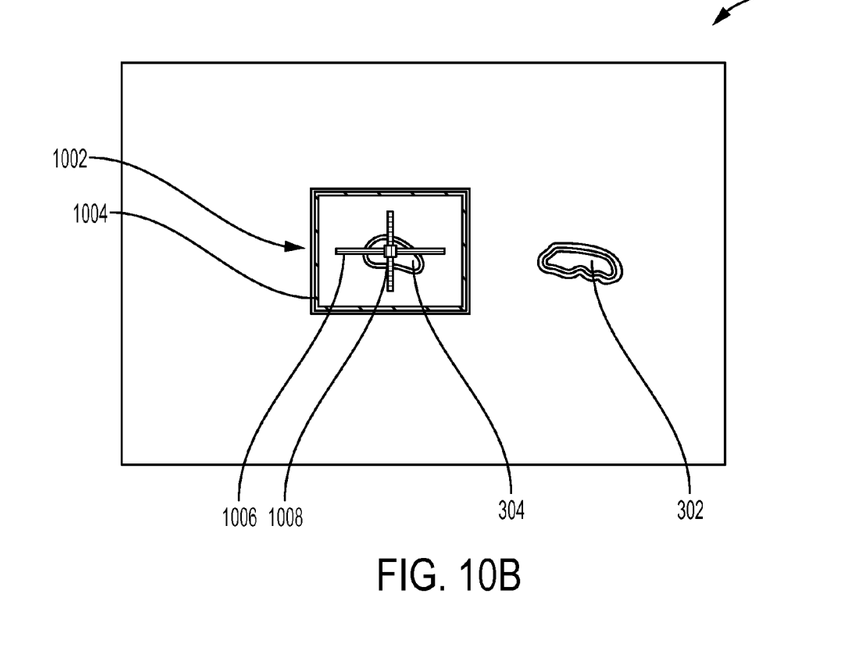
FIG. 10B is an illustrative scope image showing how the region of interest indicator of FIG. 10A can provide an alignment alert, in accordance with an embodiment.

As shown in image 1000B of FIG. 10B, when a user moves the riflescope reticle 1002 into position so that the target indicator 1008 is coincident with the center of crosshairs 1006, the one or more portions of the reticle (e.g., crosshairs 1006, ROI indicator 1004 and/or target indicator 1008) may change color or blink to indicate target lock. In this way, a shooter would be notified that it is time to press the trigger for that target.

In one embodiment, a black region of interest indicator 1004 may be provided with blue crosshairs 1006 and a white blob corresponding to target 304 in the region of interest may be highlighted with a red centroid square marker 1008 drawn on it, and when the blue crosshairs line up with the red centroid marker, the ROI indicator around the region of interest may turn green indicating it is time to press the trigger.

Figure 11:
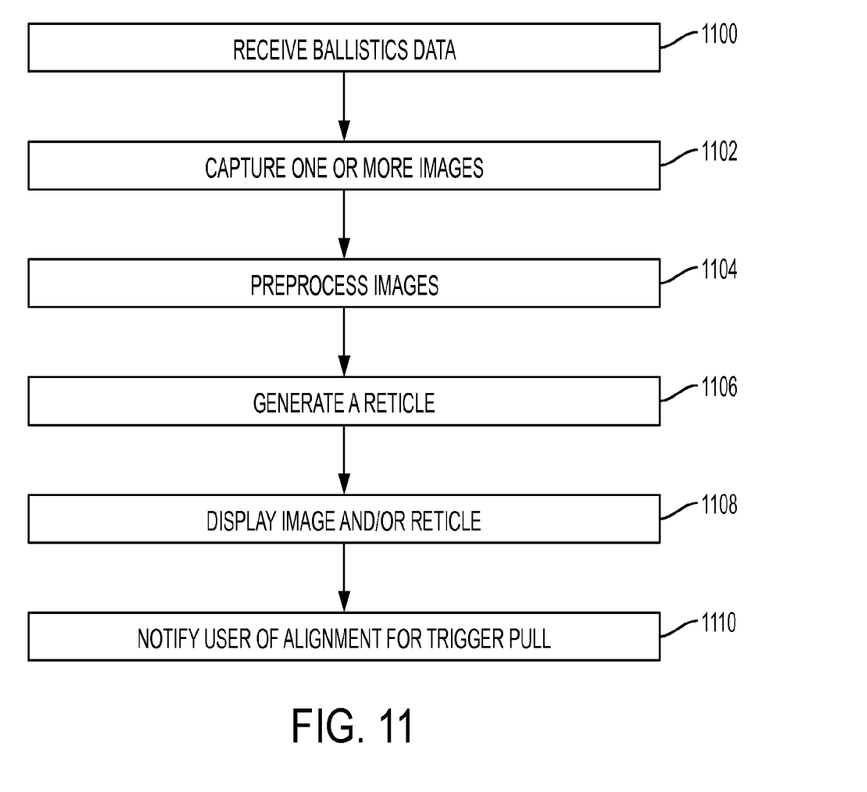
FIG. 11 shows a flowchart of illustrative operations for operating a rifle scope having an electronic adaptive reticle, in accordance with an embodiment.

Illustrative operations that may be performed providing an adaptive electronic reticle are shown in FIG. 11 according to one or more embodiments.

At block 1100, ballistics data such as firearm specifications and ammunition specifications may be received by a firearm scope such as a riflescope such as an imaging riflescope as described herein in connection, for example, with FIGS. 1 and 2. The ballistics data may include table data uploaded to the scope by a user via an input port such as a USB port of the scope. Before and/or after the ballistics data is received, the scope may be mounted to a firearm. The ballistics data may include velocity, energy, and/or trajectory information for various cartridges, bullets, and firearms including the particular firearm and/or ammunition to be used.

At block 1102, one or more images may be captured. Captured images may include one or more thermal images and/or one or more non-thermal images. The images may be captured by an imaging component of the scope.

At block 1104, the captured images may be preprocessed. Preprocessing of the capture images may include analog to digital conversion operations, gain operations, noise reduction operations, non-uniformity correction operations, multispectral image combination operations, flat fielding operations, and/or other suitable image processing operations.

At block 1106, a reticle may be generated by the scope. The reticle may be an adaptive electronic reticle. The reticle may be generated based on the captured and/or preprocessed images, user settings, ballistics information, target information such as target range information, wind information or other information associated with the firearm, the target, the images, scope optics, and/or environmental conditions as described, for example, above in connection with any or all of FIGS. 1-10B.

At block 1108, the generated reticle may be displayed. The reticle may be displayed in line with a direct view of a target scene (e.g., generated by a semitransparent display component that allows the user to see the target scene directly through the optics of the scope with the electronic reticle visible on the direct view target scene) and/or overlaid or otherwise combined with an image of the scene such as one or more of the captured and/or preprocessed images. The generated reticle may include inverted colors or greyscales, external highlights, static or moving patterns, ballistics features, indicators such as target indicators or region of interest indicators as described above in connection with any or all of FIGS. 3-9, 10A and 10B.

At block 1110, a notification may be provided to a user of the firearm of target alignment for a trigger pull. For example, providing a notification to the user may include altering the appearance of the displayed reticle (e.g., by changing the color, blinking, or otherwise altering one or more portions of the reticle) when a detected target is aligned with the desired aiming position of the firearm. For nearby targets the notification may be provided when it is determined by the scope that the target is aligned with the barrel of the firearm as indicated by alignment of the target, for example, with the center of crosshairs at the center of a scope aligned with the barrel. For distant targets, the notification may be provided when it is determined by the scope that the target is aligned with a bullet drop or windage corrected position of the firearm as indicated by alignment of the target, for example, with the center of crosshairs at a corrected position other than the center of a scope aligned with the barrel or by alignment of the target, as another example, with a bullet drop and/or windage position hold position located away from the center of crosshairs that are located at the center of the scope.

Figure 12:
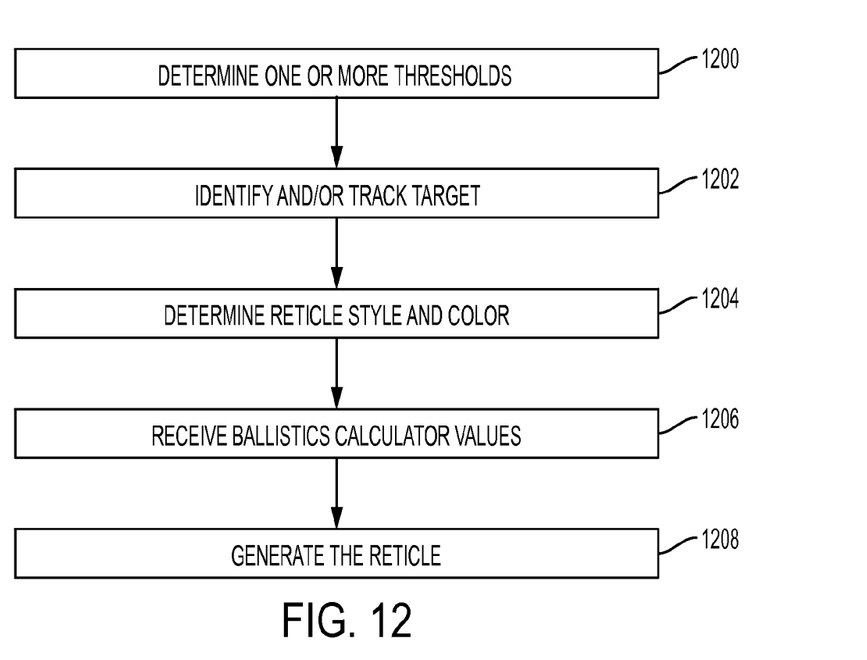
FIG. 12 shows a flowchart of illustrative operations for generating an electronic adaptive reticle, in accordance with an embodiment.

Illustrative operations that may be performed for generating the reticle as described, for example, in connection with block 1106 of FIG. 11 are shown in FIG. 12.

At block 1200, one or more thresholds may be determined. For example one or more temperature thresholds may be determined for a detecting a target in a thermal image. For example, a temperature range of a human or animal (e.g., a range between about 75° F. and about 100° F.) may be determined. The threshold may be determined based on user input, based on default settings for a particular operation or environment or target, and/or based on scene content of an image.

At block 1202, a target may be identified and/or tracked. The target may be identified in, for example, a captured image such as a captured thermal image. The target may be identified as, for example, a contiguous group of thermal image pixels having pixel values corresponding to temperature in the temperature range. Tracking the target may include tracking movement of the contiguous group of pixels in subsequently captured images. Tracking the target may include tracking changes in the position and/or range of the target.

At block 1204, a reticle style and/or color may be determined. Determining the reticle color may include determining one or more colors for one or more corresponding portions of a crosshairs of the reticle based on scene and/or target information from a captured image. Determining the reticle style may include determining whether the reticle includes crosshairs, Mil-Dots, bullet drop and/or windage hold indicators, a target indicator, a region of interest indicator or other features based on user input, ballistics information, environmental conditions, target information or other information. Determining the reticle style may also include determining whether the reticle to be generated is a static reticle or a dynamically changing reticle.

At block 1206, ballistics calculator values may be received. For example, ballistics calculator values may include a current range value or set of range values, current wind conditions, and/or target type information. The ballistics calculator values may be received via user input and/or built-in or external sensors such as a rangefinder and/or a wind sensor.

At block 1208, the reticle may be generated. Generating the reticle may include generating display signals to be provided to a display of the scope, where the display signals are generated to produce on the display a reticle according to the target identifying and tracking information, the determined reticle style and color, and any ballistics corrections based on the ballistics data and the ballistics calculator values.

The methods and systems disclosed herein better facilitate aiming at and shooting at targets with a firearm.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
 a scope configured to mount to a firearm, the scope comprising:
 an imaging component configured to capture an image of a target scene;
 a processing component configured to:
 determine an appearance of an adaptive electronic reticle based on at least thermal information associated with the target scene; and
 generate the adaptive electronic reticle; and
 a display component configured to display the adaptive electronic reticle.

2. The system of claim 1, wherein the display component is configured to display the adaptive electronic reticle in line with a direct view of the target scene through the scope, and wherein the processing component is further configured to alter the appearance of the adaptive electronic reticle based on changes in the target scene and/or movement of the scope.

3. The system of claim 1, wherein the display component is configured to display the adaptive electronic reticle in combination with the image and/or subsequently captured images.

4. The system of claim 3, wherein the imaging component comprises a thermal imaging component.

5. The system of claim 4, wherein the imaging component further comprises a non-thermal imaging component.

6. The system of claim 3, wherein the processing component is configured to determine the appearance of the adaptive electronic reticle by determining first and second colors for the adaptive electronic reticle based on a threshold.

7. The system of claim 3, wherein the processing component is further configured to generate a border enhancement for the adaptive electronic reticle.

8. The system of claim 3, wherein the processing component is configured to determine the appearance of the adaptive electronic reticle by determining a textured pattern, style, and/or colors for the adaptive electronic reticle.

9. The system of claim 8, wherein the processing component is further configured to alter the textured pattern, style, and/or colors over time.

10. The system of claim 9, wherein the processing component is further configured to alter the textured pattern, style, and/or colors over time based on changes in the target scene and/or movement of the scope.

11. The system of claim 3, wherein the adaptive electronic reticle comprises ballistics features and wherein the processing component is configured to determine the ballistics features based on ballistics information for the firearm.

12. The system of claim 11, wherein the scope further comprises an input data port configured to receive the ballistics information.

13. The system of claim 3, wherein the adaptive electronic reticle includes a target indicator that highlights a target detected using the image, a crosshairs, and a region-of-interest indicator that surrounds a region of interest in the image.

14. The system of claim 13, wherein the processing component is configured to:
identify and track the target based on at least the image; and
operate the display component to alter the region-of-interest indicator and/or the crosshairs when a center of the crosshairs is aligned with the target indicator.

15. The system of claim 3, wherein the processing component is configured to determine the appearance of the adaptive electronic reticle based on the image and a target range.

16. The system of claim 15, further comprising a rangefinder configured to determine the target range and provide the target range to the processing component.

17. The system of claim 16, wherein the processing component is configured to determine the appearance of the adaptive electronic reticle based on the image, the target range, and wind information.

18. The system of claim 1, further comprising the firearm, wherein the scope is mounted to the firearm, and wherein the processing component is configured to determine the appearance of each portion of the adaptive electronic reticle based on one or more respective pixel values of the image associated with the portion.

19. A method, comprising capturing an image of a target scene;
determining an appearance of an adaptive electronic reticle based on at least thermal information associated with the target scene;
generating the adaptive electronic reticle; and
displaying the adaptive electronic reticle with a scope of a firearm.

20. The method of claim 19, further comprising:
prior to the capturing, mounting the scope to the firearm; and
altering the appearance of the adaptive electronic reticle in response to changes in the target scene and/or movement of the scope.

* * * * *